(12) United States Patent
Herz

(10) Patent No.: US 6,497,248 B2
(45) Date of Patent: Dec. 24, 2002

(54) PRESSURE RELIEF DEVICE WITH ONE PIECE GASKET

(75) Inventor: Joshua J. Herz, Rochester, NY (US)

(73) Assignee: Qualitrol Corporation, Fairport, NY (US)

( * ) Notice: Subject to any disclaimer, the term of this patent is extended or adjusted under 35 U.S.C. 154(b) by 0 days.

(21) Appl. No.: 09/766,315

(22) Filed: Jan. 18, 2001

(65) Prior Publication Data

US 2002/0092567 A1 Jul. 18, 2002

(51) Int. Cl.$^7$ .......................... F16K 17/04; H01F 27/02
(52) U.S. Cl. .................. 137/516.29; 137/541; 137/469; 174/11 R; 174/17 VA; 251/364
(58) Field of Search ........................... 137/469, 516.25, 137/516.27, 516.29, 541, 542; 174/11 R, 17 VA; 220/203.27, 203.29, 303, 378; 277/552, 640, 641, 644, 928; 251/364; 336/58, 60; 361/37

(56) References Cited

U.S. PATENT DOCUMENTS

| | | | |
|---|---|---|---|
| 162,831 A | * 5/1875 | Kunkle | 137/516.27 |
| 1,252,940 A | * 1/1918 | Osborne | 137/516.27 |
| 1,572,507 A | * 2/1926 | Robert | 137/516.27 |
| 2,614,582 A | * 10/1952 | St. Clair | 137/512 |
| 2,828,765 A | * 4/1958 | Hilkemeier | 137/516.29 |
| 2,881,368 A | * 4/1959 | Hancock | 220/203.27 |
| 2,904,616 A | * 9/1959 | Koepke et al. | 137/469 |
| 3,100,502 A | * 8/1963 | Ford et al. | 137/469 |
| 3,131,718 A | * 5/1964 | Mingrone | 137/512.1 |
| 3,189,675 A | * 6/1965 | Moore et al. | 174/11 R |
| 3,217,082 A | 11/1965 | King et al. | |
| 3,710,002 A | * 1/1973 | Link | 174/17 LF |
| 3,772,624 A | * 11/1973 | Keogh | 137/541 |
| 3,844,310 A | * 10/1974 | Brindisi | 137/467 |
| 4,091,837 A | * 5/1978 | Edmunds et al. | 137/341 |
| 4,176,680 A | * 12/1979 | de Launay | 137/516.29 |
| 4,431,023 A | 2/1984 | Johnson | |
| 4,676,266 A | 6/1987 | Johnson | |
| 4,843,187 A | * 6/1989 | Johnson | 174/11 R |
| 4,911,403 A | * 3/1990 | Lockwood, Jr. | 137/516.29 |
| 4,958,742 A | * 9/1990 | Berwald et al. | 137/541 |
| 5,165,444 A | * 11/1992 | Dean | 137/469 |
| 5,404,903 A | * 4/1995 | Anderson et al. | 137/516.27 |
| 5,937,893 A | 8/1999 | Herz | |

FOREIGN PATENT DOCUMENTS

| | | | |
|---|---|---|---|
| AT | 139056 | * 10/1934 | |
| DK | 69515 | * 7/1949 | |

OTHER PUBLICATIONS

Qualitrol Corporation Series 208 Pressure Relief Device, Bulletin QT 4–208.
Qualitrol Corporation Series 213 Pressure Relief Device, Bulletin QT1–213.
Qualitrol Corporation Series 206 Medium Pressure Relief Device.

* cited by examiner

Primary Examiner—John Rivell
Assistant Examiner—Ramesh Krishnamurthy
(74) Attorney, Agent, or Firm—Stephen B. Salai, Esq.; Brian B. Shaw, Esq.; Harter, Secrest & Emery LLP

(57) ABSTRACT

Disclosed is a pressure relief valve for attachment to a closed vessel having an opening to vent gas and liquids from the housing should the internal housing pressure rise to unacceptable levels. The pressure relief valve includes a single gasket that seals between a valve disk and a collar disposed about the opening. The gasket is fixed to the collar by a single retaining ring and effects seals with the disk valve in two planes, one seal is in a plane generally parallel to the plane of the opening and a second seal is in a plane generally normal to the plane of the opening. Moreover, the second seal remains in tact for a short time after the first seal is broken to permit the rapid separation of the disk valve from the gasket to vent gas and liquids from the housing.

25 Claims, 1 Drawing Sheet

FIG. 1
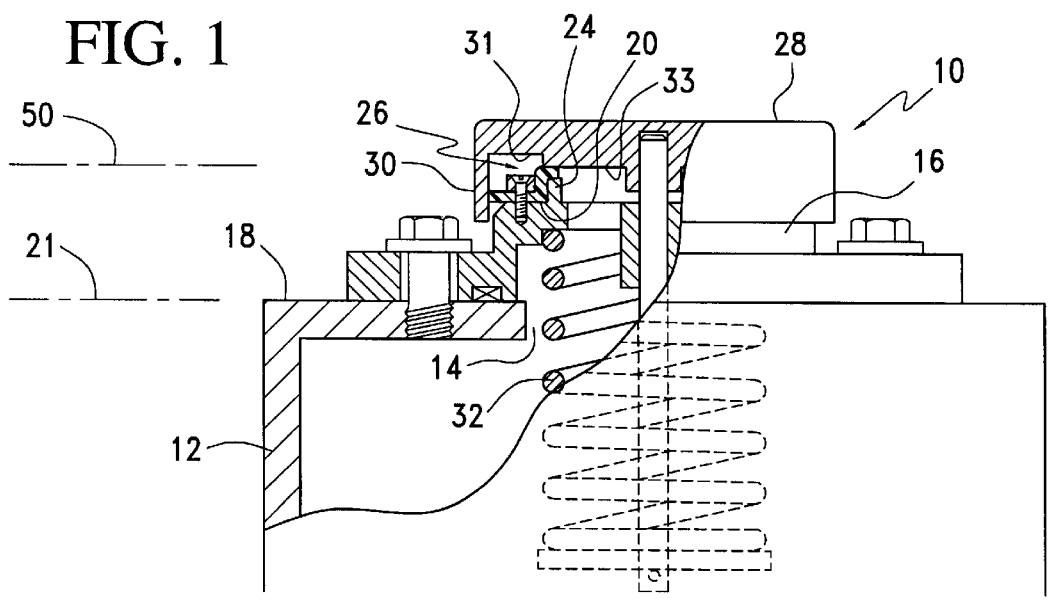
FIG. 2
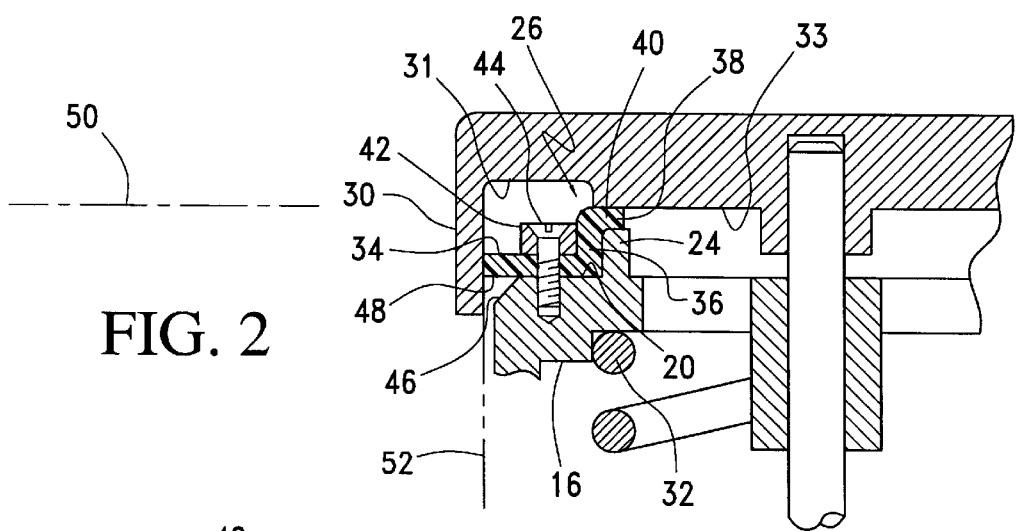
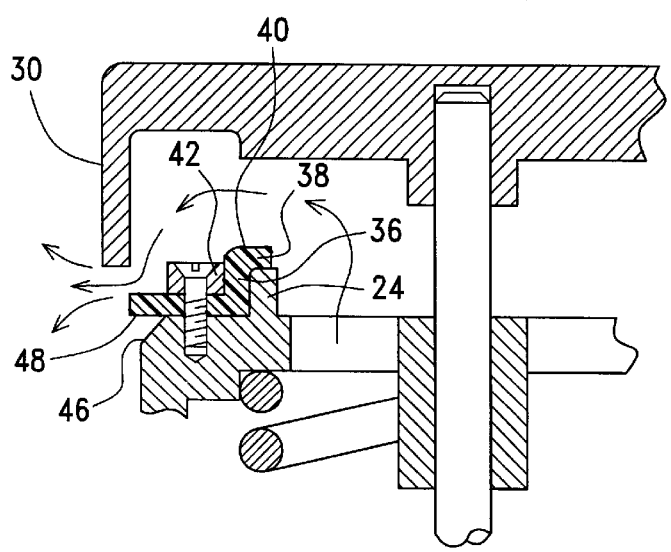
FIG. 3

PRESSURE RELIEF DEVICE WITH ONE PIECE GASKET

TECHNICAL FIELD

The present invention relates generally to a pressure relief device as may be used with an electrical apparatus such as a transformer housing. More particularly, the present invention relates to a pressure relief valve for closing a vent opening in a power transformer housing. The pressure relief valve includes gasket means for effecting seals in planes that extend both parallel and normal to the axis of the vent opening and that maintains one seal after the other is broken.

BACKGROUND OF THE INVENTION

Pressure relief devices are commonly used with electrical apparatus and particularly with high voltage transformers. Such transformers are usually in sealed housings that often contain a dielectric fluid. If, for example, the pressure within the transformer housing should increase due to an increase in ambient temperature, an internal fault or other reason, it may be necessary to vent the pressure in order to prevent a catastrophic failure of the transformer housing. These pressure relief devices are designed so that once a predetermined pressure is reached, a considerable amount of fluids such as hot oil and gas, are vented from the transformer housing in a very short time to rapidly reduce the pressure within the housing. After venting, the pressure relief device closes to again seal the vent opening.

A typical pressure relief device as shown in U. S. Pat. No. 4,676,266 includes a tubular base that is fixed about an opening in the transformer housing. A spring loaded valve disk having a depending skirt is urged down over the tubular base to close the opening. The design of the device shown in the '266 Patent requires two gaskets between the valve disk and the tubular base. One is a top gasket that lies in a seat formed on the end face of the tubular base. This gasket seals against an under surface of the valve disk. A second gasket is a side gasket, sometimes in the form of an O-ring or a flat annular gasket that is seated in a groove extending about the periphery of the tubular base. This side gasket seals against the inner periphery of the depending skirt and maintains a seal after the seal at the top gasket is broken.

A problem associated with the dual gasket arrangement as disclosed in the '266 Patent, concerns the retention of the two gaskets in their respective seats during a venting event. Venting is a catastrophic event and the volume and flow rate of the fluids passing over both gaskets during such an event may be so great as to pull the gaskets from their respective seats. In order to prevent the top gasket from being driven from its seat by the venting fluid, it typically is locked in place with a mechanical locking ring. However, there has been no economic mechanical way to secure the side gasket so it has either been left unsecured or an epoxy was used to fix the gasket in its seat. Neither solution is entirely satisfactory.

Accordingly, it is an object of the present invention to provide a pressure relief device having an improved gasket arrangement.

Another object of the present invention is to provide a pressure relief device having an improved gasket arrangement that is less susceptible to a dislocation of the gasket by the force of fluids venting from the housing and through pressure relief device.

Yet another object of the invention is to provide a pressure relief device having a single gasket that effects seals in two planes and that maintains the seal in one plane intact after the other is broken.

A further object of the invention is to provide a pressure relief device in which the functions performed by the dual gasket arrangement of the prior art are performed by a single gasket structure that is mechanically secured in place.

SUMMARY OF THE INVENTION

The present invention provides a pressure relief device having a gasket structure that combines features and functions of the top and side gaskets of the prior art in a single structure. The gasket structure provides both a top seal portion and a side seal portion and is arranged to maintain a side seal until after the top seal is broken. Moreover, a pressure relief device having an integral gasket structure is easier to manufacture and maintain since a single mechanical attachment means will prevent dislocation of both gasket portions by the force of the venting fluids.

Accordingly, the present invention may be characterized in one aspect thereof by a pressure relief device for mounting to a housing for hermetically isolating electrical apparatus, the device comprising:

a) a collar attachable to a surface of the housing and about a vent opening in the surface, the collar upstanding from the surface;

b) a valve disk fitting over the collar, the valve disk having a depending skirt surrounding the collar;

c) bias means urging the valve disk axially towards the collar for closing the vent opening;

d) a single gasket having a first generally planar surface for effecting a first seal between the valve disk and the collar in a plane generally parallel to the plane of the vent opening and a second surface extending around the periphery of the collar for effecting a second seal between the collar and skirt in a plane generally normal to the plane of the vent opening, the second surface being arranged to maintain a sealing contact with the skirt after the breaking of the first seal; and e) a retaining ring for attaching the gasket to the collar.

DESCRIPTION OF THE DRAWINGS

FIG. 1 is a vertical cross-sectional view of a pressure relief device of the present invention shown mounted upon an enclosed housing of an electrical transformer;

FIG. 2 is a view partly broken away and in section of a portion of FIG. 1 showing the pressure relief device of the present invention in a closed position: and FIG. 3 is a view similar to FIG. 2 only showing the pressure relief device in an open position.

DETAILED DESCRIPTION OF THE INVENTION

Referring to the drawings, FIG. 1 shows the pressure relief device of the present invention generally indicated at 10 fixed to a transformer housing 12. As is customary in the art, the transformer housing contains a dielectric liquid (not shown) and has one or more openings 14 for venting the pressure within the housing should the internal pressure rise above predetermined limits.

The pressure relief device 10 includes a preferably tubular collar 16 that is attached to a surface 18 of the housing and upstands from about the opening 14. The collar includes an end face 20 that lies in a plane extending generally parallel to the plane 21 of the opening 14 when the collar is attached to the transformer housing. Extending axially from the end face of the collar is an annular rib 24. As further described hereinbelow, the rib 24 and the collar end face 20 together define a seat for a gasket generally indicated at 26. The specific shape of the collar and orientation of the end face may vary from that shown without affecting the basic function of the invention.

Fitted over the collar is a valve disk 28 that has a depending skirt 30 surrounding the collar 16. The under surface 31 of the valve disk is opposed to the rib 24. A bias means, such as a coil spring 32, between the collar 16 and valve disk 28 is arranged to urge the valve disk towards the collar and the gasket 26 so as to close the opening 14 as shown in FIGS. 1 and 2.

As noted above, the collar end face 20 and the rib 24 define a seat for the gasket. In this respect, FIG. 2 shows the gasket 26 as having a flat section 34 resting on the collar end face 20, an upstanding portion 36 that surrounds and fits against the rib 24 and a lip 38 that extends radially inward over the top of the rib. The upstanding gasket portion 36 is thicker than either the flat section or the lip. Also, the portion 40 of the gasket where the lip portion merges with the upstanding portion preferably has a rounded internal corner that matches a rounded profile of the outer edge of the rib 24. The rounded internal corner and the thickness of the upstanding portion add rigidity to resist the flexing of the lip 38 up and off of the rib.

The gasket is preferably fixed in its seat (on the end face 20 and against the rib 24) by a retaining ring 42. The retaining ring surrounds the upstanding gasket portion 36 and bears against the flat section 34 of the gasket. The retaining ring is attached to the collar by any suitable fasteners such as screws 44. While a retaining ring is preferred, other arrangements for fixing the gasket in place such as fasteners, adhesives, snap rings or the like may be employed. These arrangements may attach the gasket to the collar end face or to rib 24.

A portion of the collar outer edge 46 below the gasket is beveled so that an outer portion 48 of the flat section of the gasket is unsupported. This allows the outer portion of the gasket to extend radially outward from the collar and to flex up and down for purposes set out herein below.

When the pressure relief device is in a closed position as shown in FIGS. 1 and 2, the bias of the coil spring 32 urges the valve disk to a closed position. In the closed position, the undersurface 31 of the valve disk is in facing relationship with the gasket lip 38 and presses the lip between the under surface and the top of the opposed rib 24. This effects a first seal in a plane 50 that lies generally parallel to the plane 21 of the opening 14. At the same time, the outer portion 48 of the gasket wipes against the inner surface of the skirt to effect a second seal in a plane 52 that is generally normal to the plane of the opening 14. Thus, the outer portion 48 defines a second seal area that circumscribes the first seal area affected by the lip 38.

In operation, and with the valve disk 28 seated against the gasket lip 38, the pressure with in the housing 12 is communicated through the housing opening 14 and tubular collar 16 to the undersurface 31 of the valve disk. In particular, the pressure is applied to a circular area 33 defined by the inner diameter of the gasket lip 38. Normally, this pressure is insufficient to overcome the bias of the coil spring 32 so the opening remains closed. However, should the pressure within the housing rise to a sufficiently high level, this higher pressure exerted on the inner circular area 33 overcomes the bias of the coil spring. This causes the valve disk 28 to lift from the gasket lip 38 breaking the seal between the valve disk and the gasket lip along plane 50.

When the valve disk separates from the gasket lip 38, the pressure within the housing is immediately communicated to the larger circular area comprising the entire under surface 31 of the valve disk out to the skirt 30. However, even after the first seal at the gasket lip 38 is broken, the outer portion 48 of the gasket maintains a second seal by wiping against the inner surface of the skirt 30 as the valve disk moves away from the gasket. Maintaining this second seal after the first seal is broken momentarily prevents venting of the fluids. This containment of the pressure under the entire area 31 increases the opening force on the valve disk and causes the valve disk to pop open breaking the seal between the gasket outer portion 48 and the skirt along plane 52 as shown in FIG. 3. Gases and liquids within the housing can now vent freely from the housing.

When the pressure within the housing has fallen to a lower level, the bias of the coil spring 32 returns the valve disk to the position shown in FIGS. 1 and 2. As the valve disk moves to its closed position, the outer portion 48 of the gasket engages the skirt 30 and flexes downwardly as it wipes along the inner surface of the skit to reestablish the side seal along plane 52. The undersurface 31 of the valve disk then contacts the lip 38 to reestablish the top seal along plane 50.

As noted above, relatively large quantities of fluids can be expelled through the opening 14 at a relatively high velocity. These venting fluids passing across the gasket lip 38 and the gasket outer portion 48 tend to pull the gasket from its seat. However, the geometry of the gasket as shown and the use of ring 42 to fasten the gasket to its seat, prevents the dislocation of the gasket from its seat. In this respect, the gasket structure incorporates two gasket portions in a unitary gasket structure that gives the single gasket the ability to effect seals in two different planes. Having a unitary structure allows the gasket to be secured in a seat by a single mechanical means and no part of the gasket is held in place by friction alone. Also, the matching profiles of the rib 24 and the gasket lip 38 helps to anchor the upstanding portion 36 of the gasket in place. The thickness of the upstanding portion relative to the lip 38 or the flat section 34 provides the upstanding portion with a degree of rigidity to resist flexing responsive to the flow of fluids across the lip.

Thus it should be appreciated that the present invention accomplishes its intended objects in providing a pressure relief device having an improved gasket arrangement. The pressure relief device of the present invention utilizes a unitary gasket structure to effect seals in two different planes wherein one seal is maintained even after a first seal is broken. A single fastener ring is relied on to anchor the gasket in its seat. The single fastener ring together with the configuration of the gasket permits the gasket to resist dislocation from its seat under the forces of high velocity, high volume flow across the two sealing planes of the gasket.

Having described the invention in detail, what is claimed as new is:

1. A pressure relief device for mounting to an outer surface of a closed housing and about a vent opening in the surface, said device comprising:
   a) a collar attachable to said surface and upstanding from about said vent opening;
   b) a valve disk fitting over said collar, said valve disk having a depending skirt with an inner surface surrounding said collar;

c) a spring urging said valve disk towards said collar for closing said vent opening; and
d) a single gasket having
   i) an upstanding portion terminating in a first surface for effecting a first seal between said valve disk and said collar in a first plane and
   ii) a radially extending portion terminating in an outermost peripheral surface for effecting a second seal between said collar and skirt, said second seal being in a plane generally perpendicular to the plane said first seal and said outermost peripheral surface being arranged to maintain a wiping sealing contact with said skirt inner surface after the breaking said first seal.

2. A pressure relief device for mounting to an outer surface of a closed housing and about a vent opening in the surface, said device comprising:
   a) a collar attachable to said surface and upstanding from about said vent opening;
   b) a valve disk fitting over said collar, said valve disk having a depending skirt surrounding said collar;
   c) a spring urging said valve disk towards said collar for closing said vent opening;
   d) a single gasket having a first surface for effecting a first seal between said valve disk and said collar and a peripheral surface for effecting a second seal between said collar and skirt, said peripheral surface being arranged to maintain a sealing contact with said skirt after the breaking of said first seal; and
   e) said collar having an end face and a rib upstanding from said end face, said end face and rib together defining a seat for said gasket.

3. A pressure relief device as in claim 2 wherein said gasket comprises:
   a) a flat section resting on said end face;
   b) an upstanding portion surrounding said rib; and
   c) a lip extending radially inward over the top of said lip.

4. A pressure relief device as in claim 3 including a retaining ring attaching said gasket to said collar, wherein said retaining ring is disposed on said flat section and surrounds said upstanding portion.

5. A pressure relief device as in claim 3 wherein the thickness of said upstanding portion is greater than the thickness of either said flat section or said lip.

6. A pressure relief device as in claim 3 wherein said upstanding portion and said lip merge in a rounded inner edge.

7. A pressure relief device as in claim 6 wherein said rib has a rounded outer edge matching the profile of said rounded inner edge.

8. A pressure relief device as in claim 3 wherein said peripheral surface is on an outer portion of said gasket flat section, said peripheral surface being in a wiping relationship with the inner surface of said skirt to effect said second seal.

9. A pressure relief device as in claim 8 wherein said peripheral surface effects said second seal at a level below the plane of said first seal.

10. A pressure relief device as in claim 8 wherein:
   a) said valve disk has an undersurface seated against said lip by the force of said spring to effect said first seal;
   b) said lip having an inner diameter that establishes a first circular area smaller than the total area of said undersurface; and
   c) said first circular area being in communication with said vent opening whereby said valve disk separates from said lip when the pressure within the housing that is exerted on said first circular area provides a force that overcomes said spring.

11. A pressure relief device as in claim 10 wherein the separation of said valve disk from said lip exposes the total area of said valve disk under surface to the pressure within said housing and said pressure being contained by said second seal and causing the sudden movement of said valve disk away from said gasket until said skirt clears said flat section of said gasket thereby opening said pressure relief device.

12. A pressure relief device as in claim 8 wherein said collar has a beveled outer edge underlying said gasket outer portion and said outer portion overhangs said beveled outer edge.

13. A pressure relief device as in claim 12 wherein said outer portion is flexible and able to flex towards said beveled edge for maintaining a wiping relationship with the inner surface of said skirt as said valve disk moves towards a closed position against said lip.

14. The pressure relief device of claim 1 in which the spring is arranged axially with respect to the valve disk and the collar.

15. The pressure relief device of claim 1 in which the first seal lies in a plane generally parallel to the plane of the vent opening.

16. The pressure relief device of claim 1 in which the second seal lies in a plane generally normal to the vent opening.

17. A pressure relief device for mounting to an outer surface of a closed housing and about a vent opening in the surface, said device comprising:
   a) a collar attachable to said surface and upstanding from about said vent opening;
   b) a valve disk fitting over said collar, said valve disk having a depending skirt surrounding said collar,
   c) a spring urging said valve disk towards said collar for closing said vent opening;
   d) a single gasket having a first surface for effecting a first seal between said valve disk and said collar and a peripheral surface for effecting a second seal between said collar and skirt, said peripheral surface being arranged to maintain a sealing contact with said skin after the breaking of said first seal; and
   e) a retaining ring attaching the gasket to the collar.

18. A pressure relief device for mounting to an outer surface of a closed housing and about a vent opening in said surface, said pressure relief device comprising:
   a) a tubular collar attachable to said surface and about said opening, said collar having an end face;
   b) a rib upstanding from said end face;
   c) a gasket seated on said end face and surrounding said rib;
   d) said gasket having a flat section including an outer peripheral portion extending radially from said collar end face, an upstanding portion surrounding said rib and a lip extending radially inward over the top of said rib;
   e) a retaining ring disposed against said gasket flat section and surrounding said upstanding portion for attaching said gasket to said end face;
   f) a valve disk having an under surface in facing relationship with said lip and a depending skirt having an inner peripheral surface surrounding said collar, said valve disk being arranged for movement axially towards and away from said collar end face with the inner peripheral surface of said skirt being in wiping engagement with said gasket outer peripheral portion;

g) bias means urging said valve disk axially towards said gasket to seat said valve disk undersurface against said lip thereby establishing a first seal in a plane generally parallel to the plane of said vent opening while said gasket outer portion bears against the inner surface of said skirt to establish a second seal in a plane generally normal to the plane of said vent opening; and h) said first seal defining a circular area of said under surface in communication with said vent opening that is smaller than the total area of said under surface.

19. A pressure relief device as in claim 18 wherein said collar has a beveled outer edge underlying said gasket outer peripheral portion and said outer peripheral portion over hangs said reveled edge.

20. A pressure relief device as in claim 19 wherein said gasket outer peripheral portion maintains a seal after the undersurface of said valve disk separates from said gasket lip responsive to a housing pressure which, when communicated to said circular area produces a force that overcomes said bias to move said valve disk away from said gasket.

21. A gasket for a pressure relief device comprising a seal member having an upright portion including a first planar surface for effecting a first seal in a first plane, and a radially extending portion terminating in an outermost peripheral surface for effecting a second seal, the outermost peripheral surface being unsupported to provide a wiping seal in a second plane and the peripheral surface circumscribing the first planar surface.

22. A gasket for a pressure relief device comprising;

a first planar surface for effecting a first seal;

a peripheral surface for effecting a second seal, the peripheral surface circumscribing the first planar surface;

a flat section including the first planar surface;

an upstanding portion connected to the flat section; and a lip, connected to the upstanding portion, extending in a direction opposite from the flat section.

23. The gasket of claim 22 which the upstanding portion is thicker than the flat section.

24. The gasket of claim 21 in which the peripheral surface is perpendicular to the first planar surface.

25. A gasket for a pressure relief device comprising a seal member having a first planar surface to effect a first seal against a first abutting surface in a first plane, and the seat member having a radially extending portion terminating in an outermost peripheral surface that extends generally normal to the first planar surface to effect a second seal against a second abutting surface in a second plane generally normal to the fist plane, the second seal being a wiping seal circumscribing the first planar surface.

\* \* \* \* \*

UNITED STATES PATENT AND TRADEMARK OFFICE
CERTIFICATE OF CORRECTION

PATENT NO.   : 6,497,248 B2
DATED        : January 18, 2001
INVENTOR(S)  : Herz, Joshua J.

It is certified that error appears in the above-identified patent and that said Letters Patent is hereby corrected as shown below:

<u>Column 6,</u>
Line 44, for the occurrence reading "skin", should read as -- skirt --.

<u>Column 8,</u>
Line 21, for the phrase reading "and the seat member having a radially extending portion" should read as -- and the seal member having a radially extending portion --.

Signed and Sealed this

Twenty-fifth Day of March, 2003

JAMES E. ROGAN
*Director of the United States Patent and Trademark Office*